United States Patent
Suzuki et al.

[11] Patent Number: 6,102,149
[45] Date of Patent: *Aug. 15, 2000

[54] WIND DEFLECTING DEVICE IN A VEHICLE INCLUDING A MOTORCYCLE

[75] Inventors: Hitoshi Suzuki; Yuji Tsujimoto, both of Saitama, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,398

[22] Filed: Dec. 19, 1997

[30] Foreign Application Priority Data

Dec. 20, 1996 [JP] Japan ................................. 8-341854

[51] Int. Cl.⁷ ................................................. B60K 11/08
[52] U.S. Cl. .......................... 180/229; 180/68.1; 180/219
[58] Field of Search .................................. 180/68.1, 229, 180/219

[56] References Cited

U.S. PATENT DOCUMENTS

| | | | |
|---|---|---|---|
| 4,557,345 | 12/1985 | Hamane et al. | 180/229 |
| 4,577,720 | 3/1986 | Hamane | 180/229 |
| 4,621,680 | 11/1986 | Funabashi | 180/229 |
| 4,648,474 | 3/1987 | Shinozaki | 180/219 |
| 4,667,758 | 5/1987 | Tamura | 180/68.4 |
| 5,715,904 | 2/1998 | Takahaski | 180/229 |
| 5,984,035 | 11/1999 | Katoh et al. | 180/68.1 |

FOREIGN PATENT DOCUMENTS

| | | | |
|---|---|---|---|
| 212170 | 11/1960 | Austria | 180/229 |
| 59-105919 | 6/1984 | Japan . | |
| 1-98093 U | 6/1989 | Japan . | |
| 4-238785A | 8/1992 | Japan . | |
| 7-246973 | 9/1995 | Japan | 180/229 |
| 9-242543 | 9/1997 | Japan . | |

*Primary Examiner*—Peter C. English
*Assistant Examiner*—Ruth Ilan
*Attorney, Agent, or Firm*—Birch, Stewart, Kolasch & Birch, LLP

[57] ABSTRACT

In a motorcycle having a engine, a fuel tank provided above the engine, and a carburetor provided behind a cylinder of the engine, a stiffener plate and a wind deflector plate are provided at such a position as to cover the front side of an engine upper space defined between the top of the cylinder and the bottom of the fuel tank. The stiffener plate and the wind deflector plate are supported to a pair of right and left down frames. The wind deflector plate is secured together with horn stays for mounting horns. The wind deflector plate has louvers for deflecting and guiding an air flow to the cylinder.

8 Claims, 10 Drawing Sheets

WIND DEFLECTING DEVICE IN A VEHICLE INCLUDING A MOTORCYCLE

BACKGROUND OF THE INVENTION

1. Field of the Invention

The present invention relates to a wind deflecting device in a vehicle such as a motorcycle.

2. Description of Background Art

Japanese Patent Laid-open No. 7-246973 discloses an icing prevention structure having an intake cover for blocking an air flow through an engine upper space defined between an engine and a fuel tank, thereby preventing a cold flow of air from coming into direct contact with a carburetor provided behind a cylinder of the engine.

However, in the above icing prevention structure, the intake cover, operating as a wall for receiving the air flow, tends to pass through the engine upper space, so that there is a possibility of increasing the operating resistance.

SUMMARY AND OBJECTS OF THE INVENTION

According to the present invention, there is provided in a vehicle including a motorcycle having a body frame, an engine supported on said body frame, a fuel tank provided above said engine, and a carburetor provided behind a cylinder of said engine. An engine upper space is defined between said engine and said fuel tank so as to extend from a front portion of said body frame towards the carburetor. A wind deflecting device comprising an air flow deflector plate having a louver provided on the front side of said engine upper space for deflecting and guiding a wind to the front side of said engine.

In this configuration, the wind deflector plate may be secured to the body frame together with a horn provided in front of the engine, In securing the wind deflector plate, the wind deflector plate may be temporarily fixed to a down frame provided before the engine with a temporary fixing member.

Further, in securing the horn, a mounting position of the horn to the body frame may be determined by a positioning member.

Since the wind deflector plate is provided on the front side of the engine upper space, the air flow is deflected and guided by the louver of the wind deflector plate to reach the front side of the engine.

Accordingly, engine cooling efficiency by the air flow can be improved. Further, a passing of the air flow through the engine upper space can be suppressed to thereby prevent icing of the carburetor.

Simultaneously, the wind is deflected and guided smoothly by the wind deflector plate, thereby minimizing running resistance.

In the case where the wind deflector plate is secured to the body frame together with the horn, a mounting structure can be simplified.

In the case where the wind deflector plate is temporarily fixed to the body frame by the temporary fixing member, the above securing operation for the wind deflector plate can be made easy.

In the case where the horn is positioned to the body frame by the positioning member, the horn can be mounted more easily and accurately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
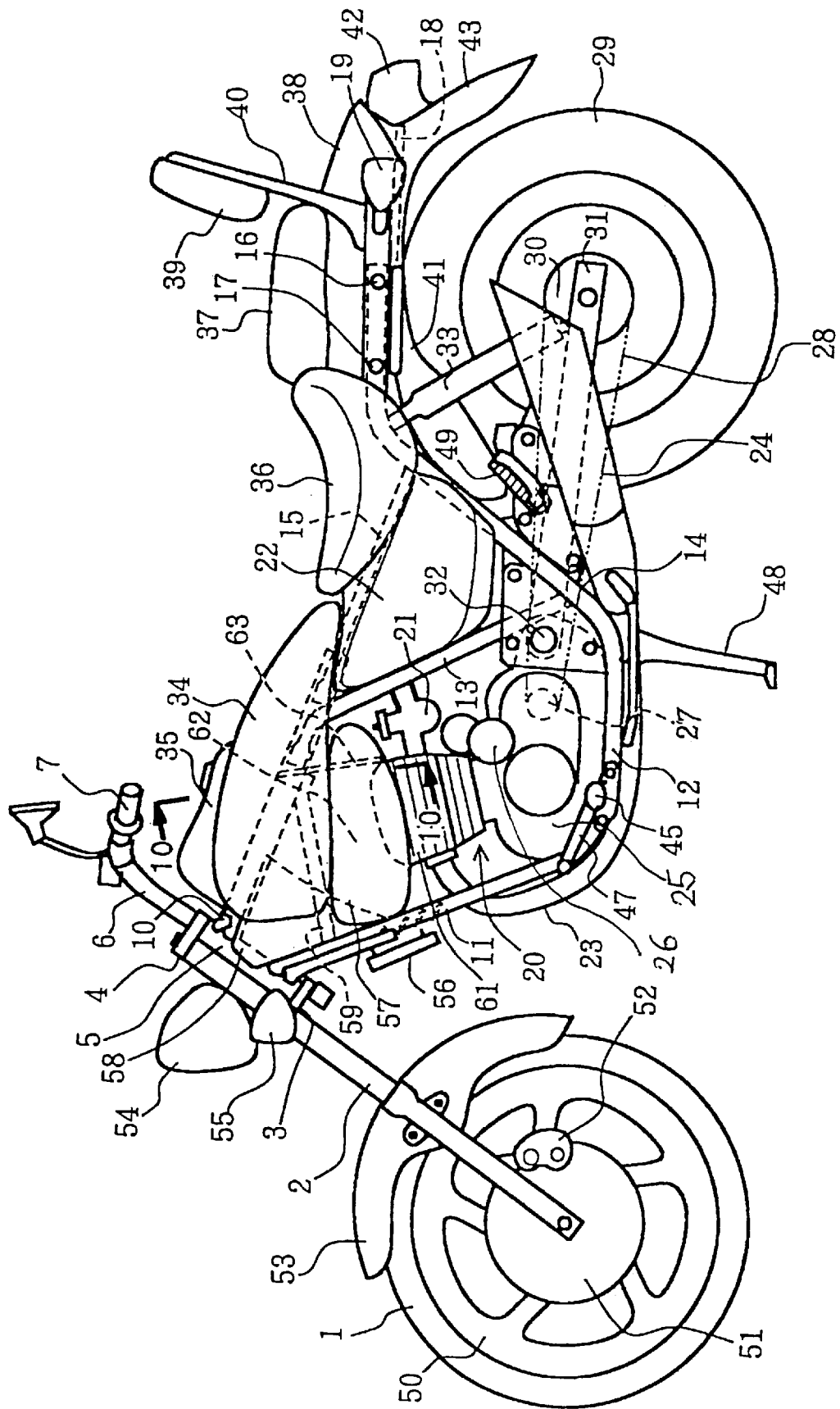
FIG. 2 is a left side view of the whole motorcycle.
Figure 3:
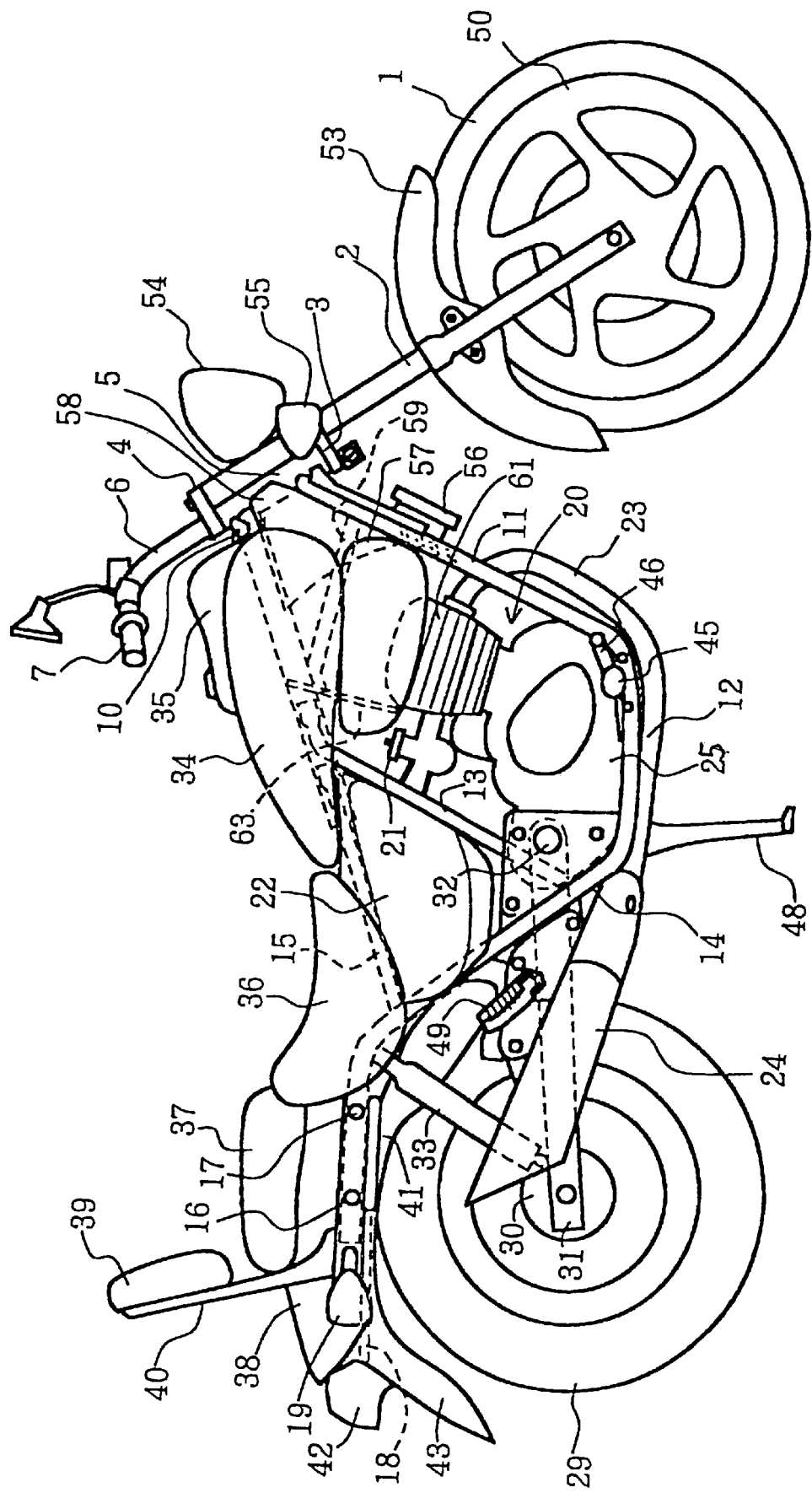
FIG. 3 is a right side view of the whole motorcycle.

A preferred embodiment of the present invention applied to a custom motorcycle will now be described with reference to the drawings. As shown in FIGS. 2 and 3, a pair of front forks 2 are rotatably supported at their upper portions through a bottom bridge 3 and a top bridge 4 to a head pipe 5. Handle bar 6 is mounted on the top bridge 4, and a pair of handgrips 7 are provided at opposite ends of the handle bar 6 at relatively rear positions and are used in a conventional manner to dictate side-to side movement of wheel 1.

The head pipe 5 is mounted to a front end portion of a main frame 10. The main frame 10 extends longitudinally of the vehicle body along its longitudinally extending center line. A pair of right and left down frames 11 extend obliquely downwardly from a lower portion of the head pipe 5. The lower ends of the down frames 11 continue to a pair of right and left lower frames 12 extending substantially horizontally in the longitudinal direction of the vehicle body.

A pair of right and left pivot frames 13 extend obliquely downwardly from the rear end of the main frame 10 in a substantially parallel relationship to the down frames 11 as viewed in a side elevation. A pair of right and left rear stays 14 extend obliquely upwardly and rearwardly from the rear ends of the lower frames 12. The lower ends of the pivot frames 13 are connected to lower portions of the rear stays 14.

A pair of right and left seat rails 15 extend substantially horizontally rearward from the rear end of the main frame 10. The rear ends of the seat rails 15 are connected to upper portions of the rear stays 14.

The rear stays 14 are bent in the vicinity of their portions connected to the seat rails 15 to further extend substantially horizontally rearward. A pair of right and left grab rails 16 are mounted on the outer side surfaces of the rear horizontal portions of the rear stays 14 by means of mounting members 17. A pair of right and left subframes 18 extend rearward from the rear ends of the rear horizontal portions of the rear stays 14. A pair of right and left rear turn signals 19 are supported to the rear end portions of the rear stays 14.

The main frame 10, the down frames 11, the lower frames 12, the pivot frames 13, the seat rails 15, and the rear stays 14 constitute a body frame. Of these frame components, the main frame 10, the down frames 11, the lower frames 12, and the seat rails 15 constituting a front portion of the body frame form a cradle frame structure. An engine 20 is supported within this frame structure.

The engine 20 intakes the ambient air from an air cleaner (not shown) provided within a pair of right and left side covers 22 through a carburetor 21, and exhausts combustion gases from an exhaust pipe 23 through a pair of right and left mufflers 24.

A crankcase 25 and a self starting motor 26 are provided wherein a driving force is transmitted from a drive gear 27 through a chain 28 to a sprocket 30, thereby driving a rear wheel 29 coaxial with the sprocket 30.

The rear wheel 29 is rotatably supported to rear end portions of a pair of right and left rear arms 31. The rear arms 31 are vertically swingably supported at their front end portions to a pivot shaft 32 provided intermediate of the pivot frames 13. A pair of right and left shock absorbers 33 are mounted between rear portions of the rear arms 31 and upper portions of the rear stays.

A fuel tank 34 is supported to the main frame 10. A dashboard 35 including various indicators and meters is provided on the upper surface of the fuel tank 34 at its front portion. A rider's seat 36 is supported to the seat rails 15 behind the fuel tank 34.

A passenger's seat 37 is supported on a rear cowl 38 behind the rider's seat 36, and a backrest 39 is provided behind the passenger's seat 37. A backrest support member 40 for supporting the backrest 39 is supported at its lower ends to the grab rails 16.

A rear fender 41 is mounted to a lower portion of the rear cowl 38. A taillight 42 and a mudguard 43 are mounted on the rear fender 41 at its rear end portion. The rear cowl 38 is supported to the subframes 18.

A pair of right and left front footrests 45, a brake pedal 46, and a gearshift pedal 47 are provided wherein parts are located below and before the engine 20 to allow a rider to take a custom motorcycle-like riding position such that the rider's legs are stretched forward.

The motorcycle further includes a side stand 48, a pair of right and left rear footrests 49, a wheel 50 formed from a light alloy, a brake disk 51, a brake caliper 52, a front fender 53, a headlight 54, a pair of right and left front turn signals 55, a pair of right and left horns 56, and a pair of right and left side covers 57 for covering the right and left sides of an upper portion of a cylinder 61 of the engine 20.

A pair of right and left side gusset plates 58 are provided to cover the right and left sides of a space surrounded by the head pipe 5, the main frame 10, and the down frames 11. Rear portions of the side gusset plates 58 overlap the inner surfaces of the fuel tank 34 and the front side covers 57 at their front portions. A reinforcing pipe 59 is mounted between the main frame 10 and the down frame 11.

Figure 10:
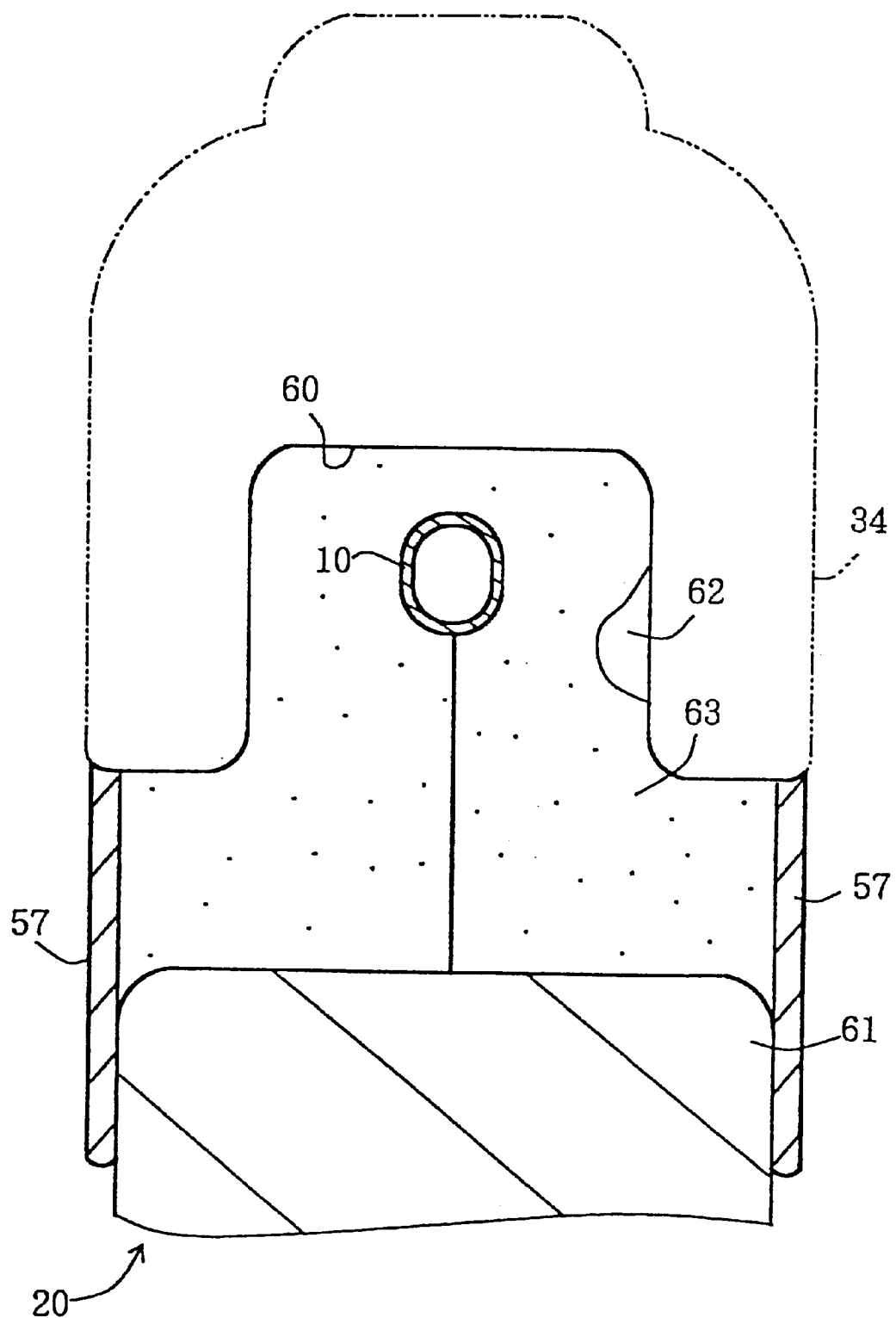
FIG. 10 is a schematic cross section taken along the line 10—10 in FIG. 2.

As shown in FIG. 10, an engine upper space 62 is defined between a bottom portion 60 of the fuel tank 34 and the cylinder 61 of the engine 20. The engine upper space 62 is separated into front and rear spaces by means of a partition wall 63.

The engine upper space 62 is a longitudinally elongated space extending from near the upper portions of the down frames 11 to the surrounding of the carburetor 21 located behind the cylinder 61.

The right and left sides of the engine upper space 62 are covered with the right and left lower portions of the fuel tank 34, the front side covers 57, and the side gusset plates 58.

The front side covers 57 cover the right and left sides of an upper portion of the cylinder 61, and the upper ends of the front side covers 57 abut against the lower ends of the right and left lower portions of the fuel tank 34.

A detailed description of a wind deflecting structure provided in front of the engine 20 is illustrated in FIGS. 1 and 4 to 9, the pair of right and left down frames 11 extend downwardly from the lower portion of the head pipe 5.

A space between the right and left down frames 11 is partially covered with a stiffener plate 65 and a wind deflector plate 66. The wind deflector plate 66 is located below the stiffener plate 65. Such a covered area of the space between the down frames 11 corresponds to a front portion of the engine upper space 62.

Figure 5:
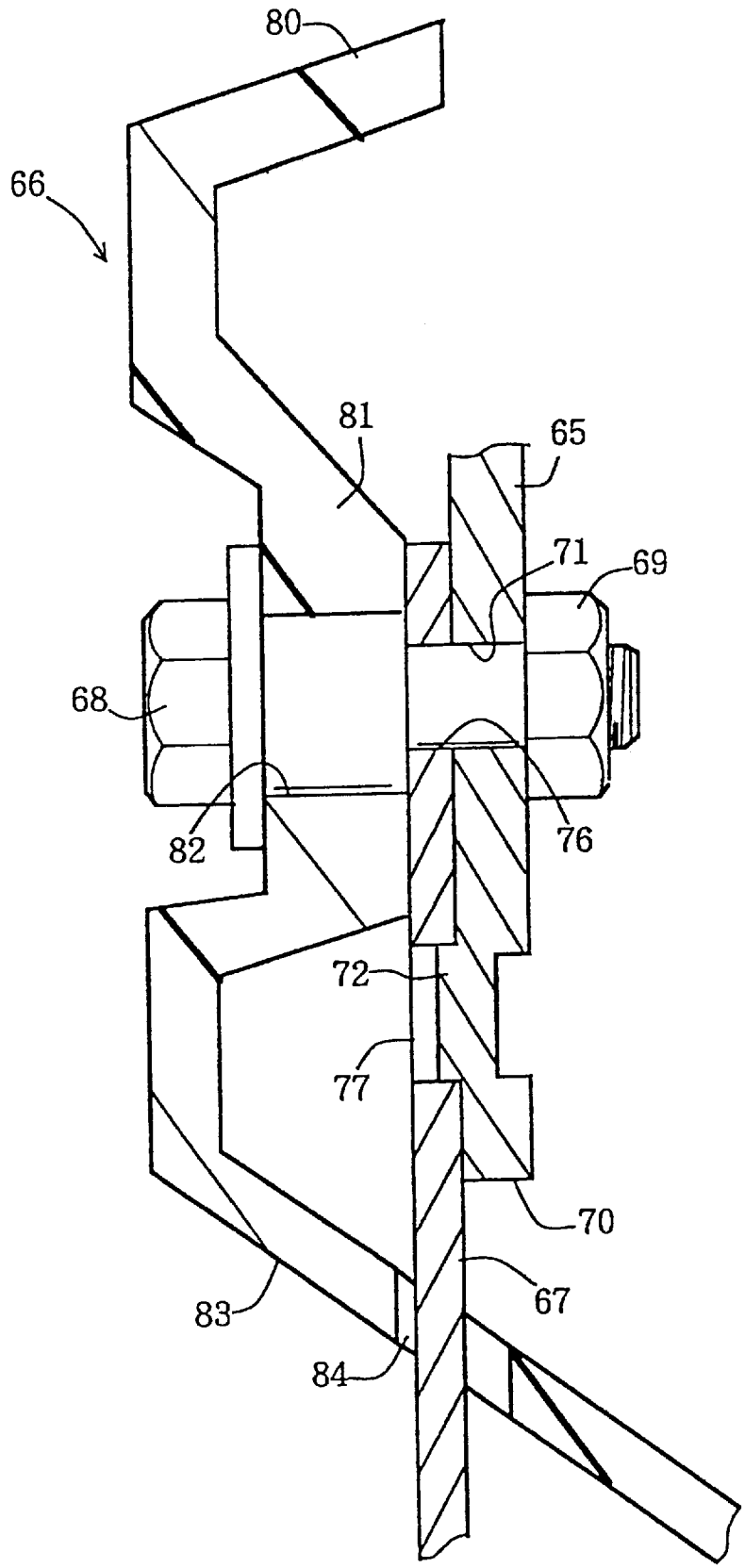
FIG. 5 is an enlarged cross section taken along the line 5—5 in FIG. 4.

An upper portion of the wind deflector plate 66 is mounted to a lower portion of the stiffener plate 65 by means of two pairs of shoulder bolts 68 and nuts 69 (see FIG. 5). A pair of horn stays 67 are also mounted at their upper end portions to the lower portion of the stiffener plate 65 by means of the shoulder bolts 68 and the nuts 69.

Figure 6:
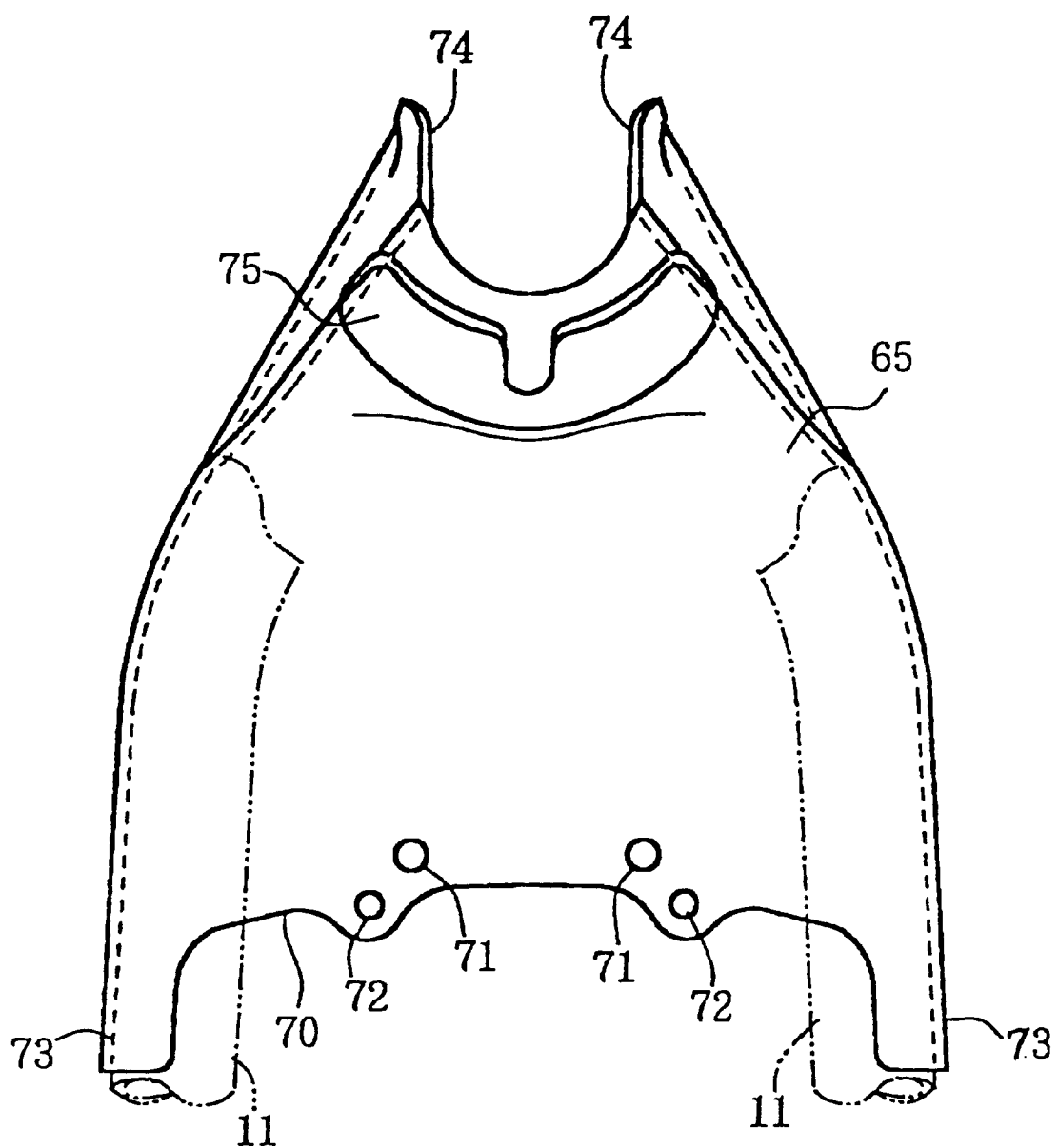
FIG. 6 is an elevational view of a stiffener plate as taken in the direction of the arrow Z.
Figure 7:
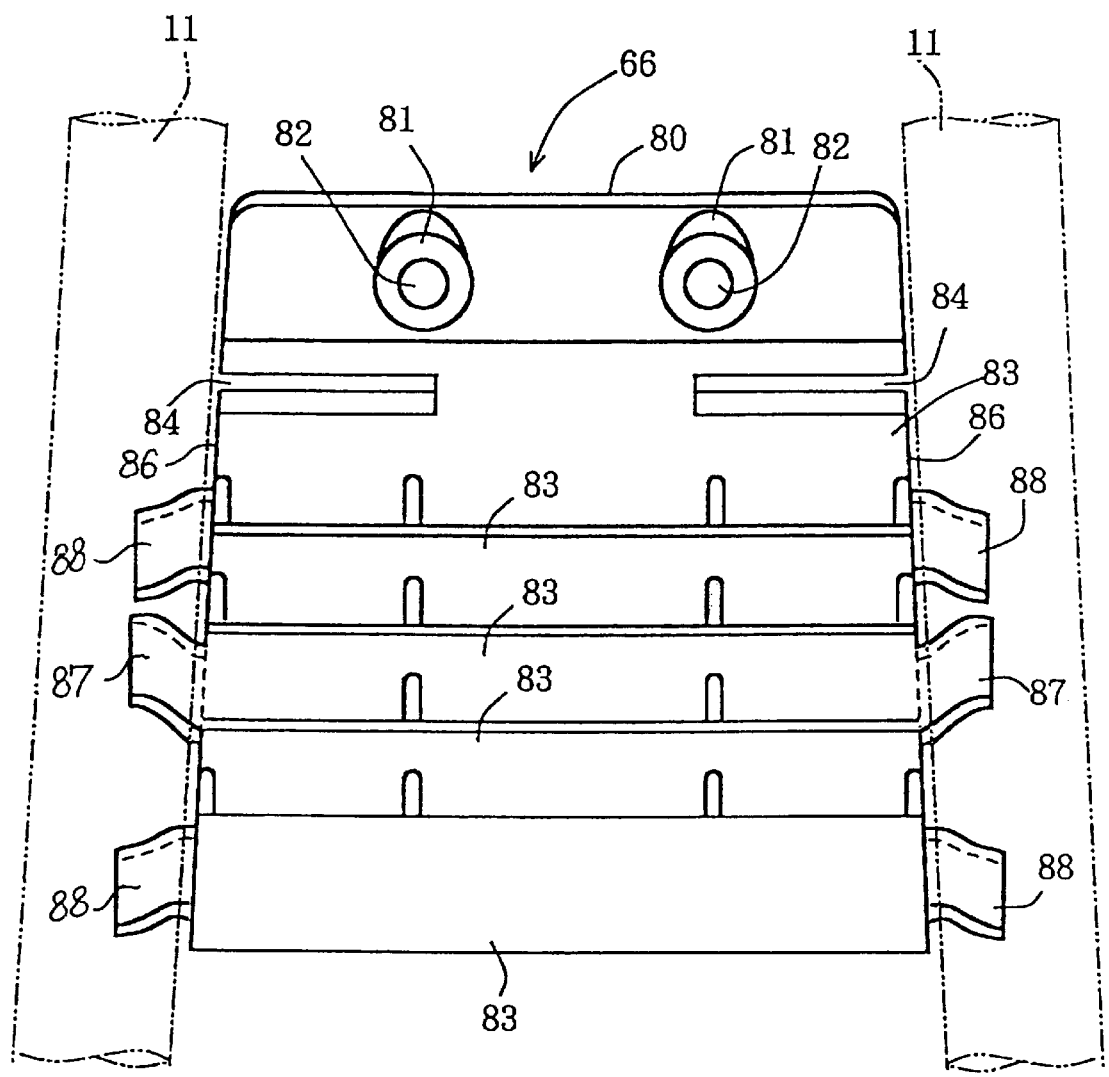
FIG. 7 is an elevational view of a wind deflector plate.

As is apparent from FIG. 6, the stiffener plate 65 is a substantially triangular member obtained by pressing or the like of an iron plate. A pair of through holes 71 for allowing insertion of small-diameter portions of the shoulder bolts 68 and a pair of positioning projections 72 are formed in the vicinity of a lower end 70 of the stiffener plate 65.

The through holes 71 and the positioning projections 72 are located in symmetry with respect to a vertical center line. The nuts 69 are welded to the stiffener plate 65 at the peripheries of the through holes 71.

A pair of right and left arcuate side portions 73 of the stiffener plate 65 are fitted with the outer circumferential surfaces of the down frames 11 and are welded thereto. A pair of upper end portions 74 of the stiffener plate 65 are welded to the outer circumferential surface of the head pipe 5 at its lower portion. A lock plate 75 is provided for locking the handle bar 6.

Figure 1:
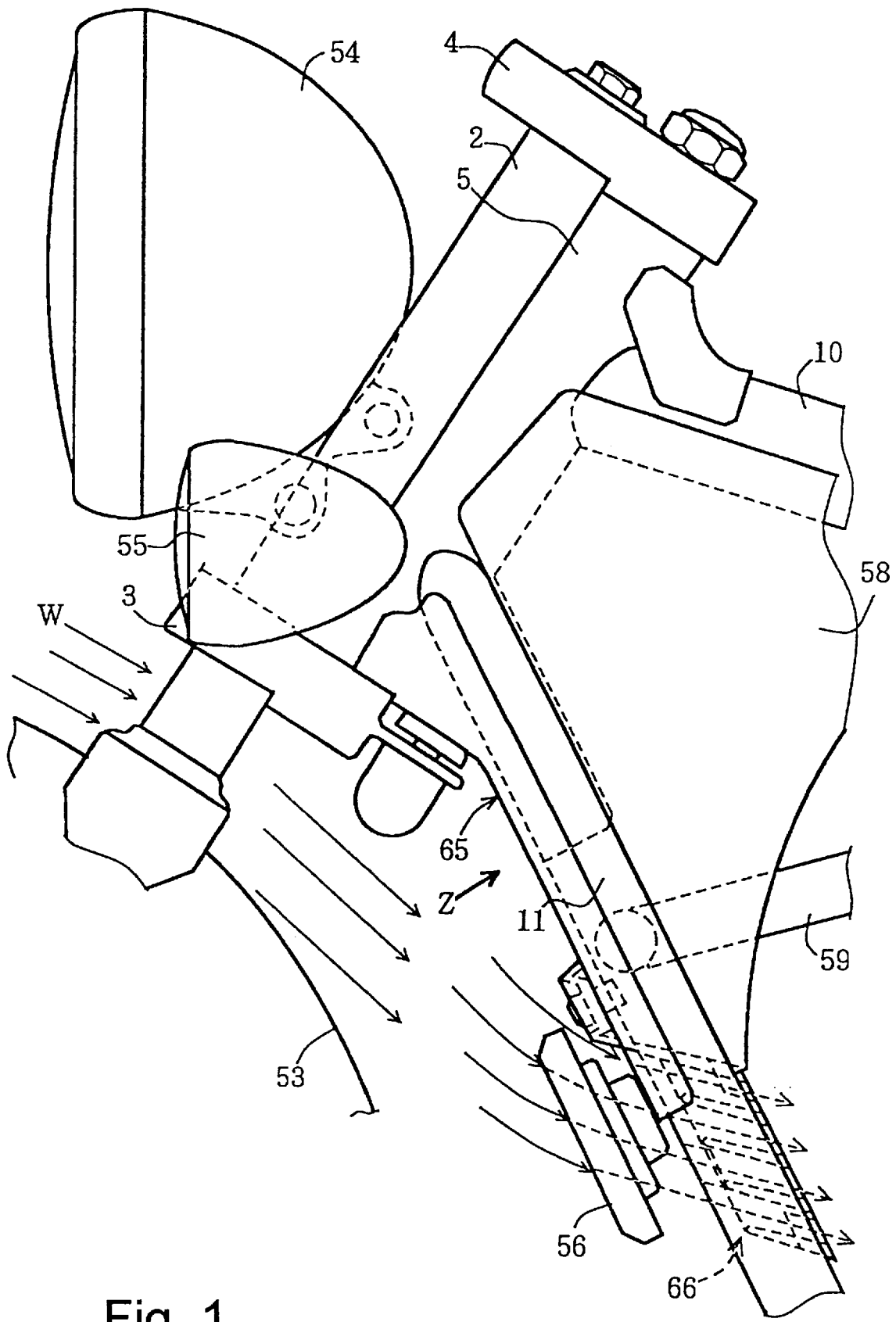
FIG. 1 is a side view of an essential part of a body frame of a motorcycle.

As shown in FIG. 1, the stiffener plate 65 mounted on the head pipe 5 and the down frames 11 is positioned so that the upper end portion of the stiffener plate 65 is inclined frontwardly. Accordingly, the front inclined surface of the stiffener plate 65 functions as a kind of wind deflecting member and wind guiding member for deflecting and guiding an air flow W toward the lower side of the stiffener plate 65.

Figure 8:
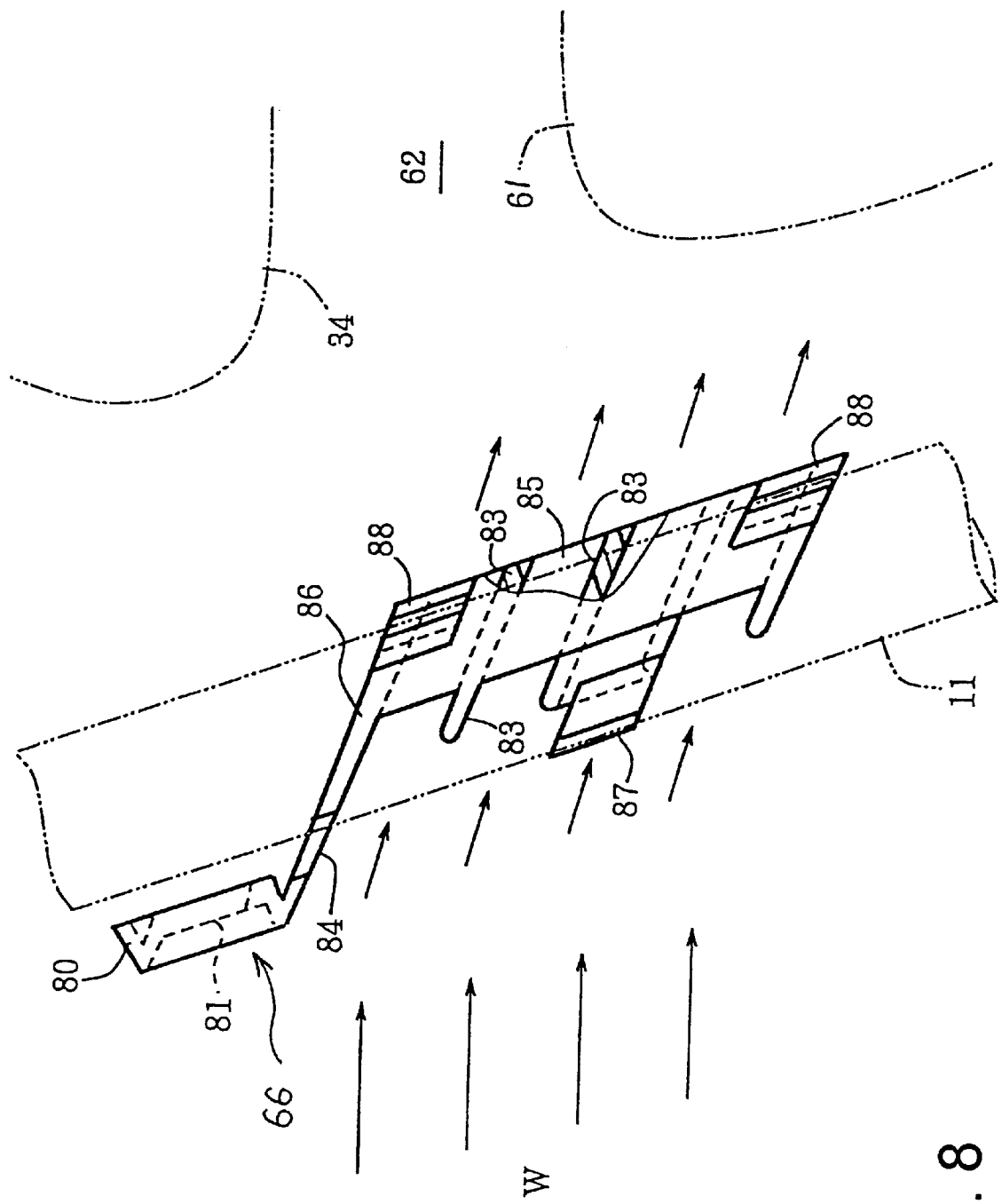
FIG. 8 is a side view of the wind deflector plate.

The wind deflector plate 66 is a resin member. As shown in FIG. 8, the wind deflector plate 66 is mounted so as to cover a front portion of the engine upper space 62, and has a height such that a lower portion of the wind deflector plate 66 overlaps an upper portion of the cylinder 61 as viewed in front or rear elevation.

An upper end portion 80 of the wind deflector plate 66 is formed with a pair of bosses 81. Each boss 81 has a through hole 82 for allowing insertion of a large-diameter portion of each shoulder bolt 68. Most of the wind deflector plate 66 below the upper end portion 80 is formed as a plurality of louvers 83 horizontally elongated and vertically arranged in parallel. The uppermost louver 83 is formed with a pair of slits 84 cut from opposite side edges 86 towards the vertical center line. The horn stays 67 are secured at their upper end portions together with the wind deflector plate 66 to the stiffener plate 65, and lower portions of the horn stays 67 are passed through the slits 84 to project to the front side of the wind deflector plate 66.

All the louvers 83 are spaced in parallel at given intervals 85 and are inclined downwardly at their rear portions to introduce the air flow W to the front side of the engine 20, especially the cylinder 61.

A plurality of front hooks 87 and rear hooks 88 project sideways from the opposite side edges 86 of the wind deflector plate 66 in such a manner as to be vertically spaced at suitable intervals in an alternate fashion.

Figure 9:
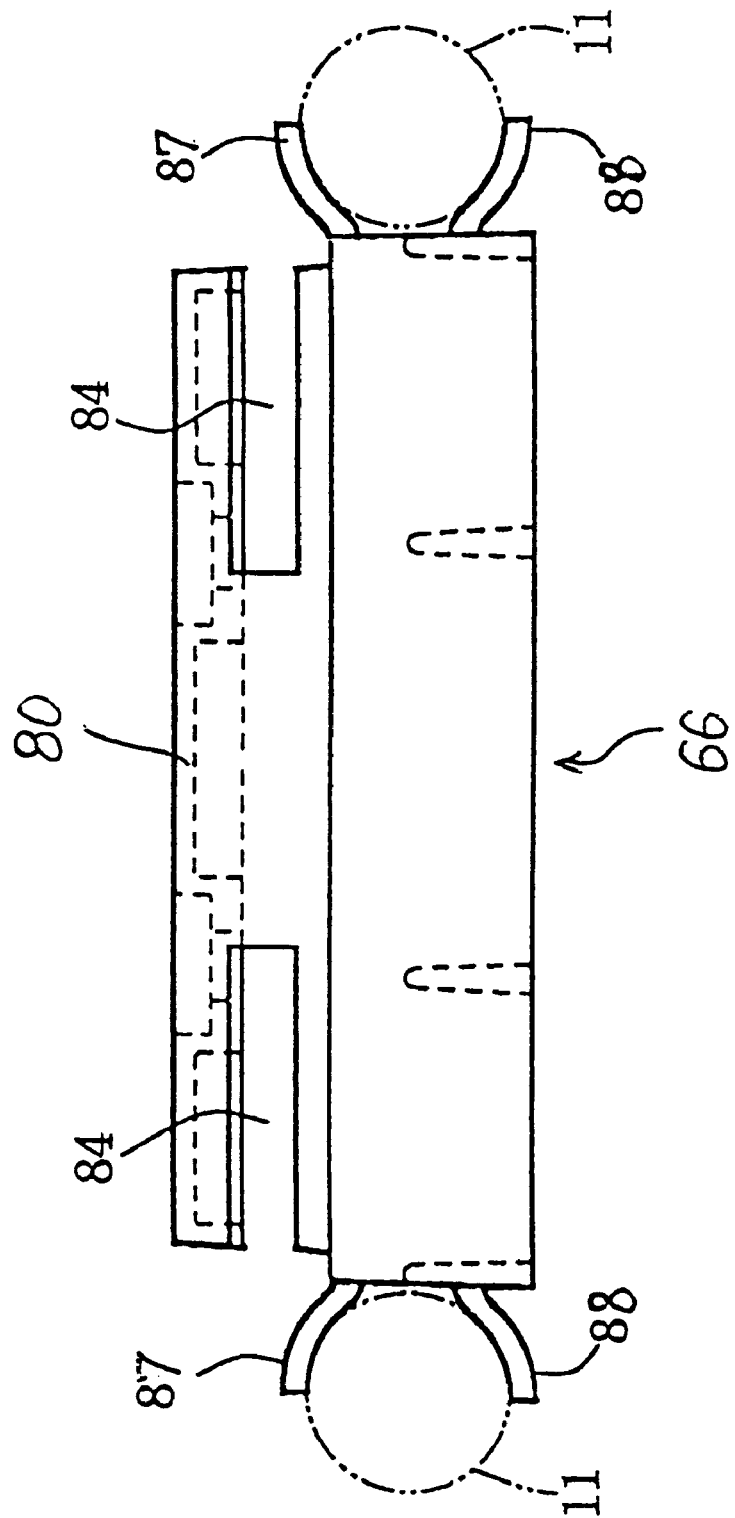
FIG. 9 is a bottom plan view of the wind deflector plate.

As shown in FIG. 9, each front hook 87 is arcuately curved frontwardly of the wind deflector plate 66 so as to be just fitted with about ¼ of the circular length of the outer circumference of each down frame 11. Each rear hook 88 is similarly arcuate except that it is curved rearwardly of the wind deflector plate 66.

Accordingly, the wind deflector plate 66 can be temporarily fixed to the down frames 11 by elastically deforming the front hooks 87 and the rear hooks 88 and fitting them with the down frames 11.

Figure 4:
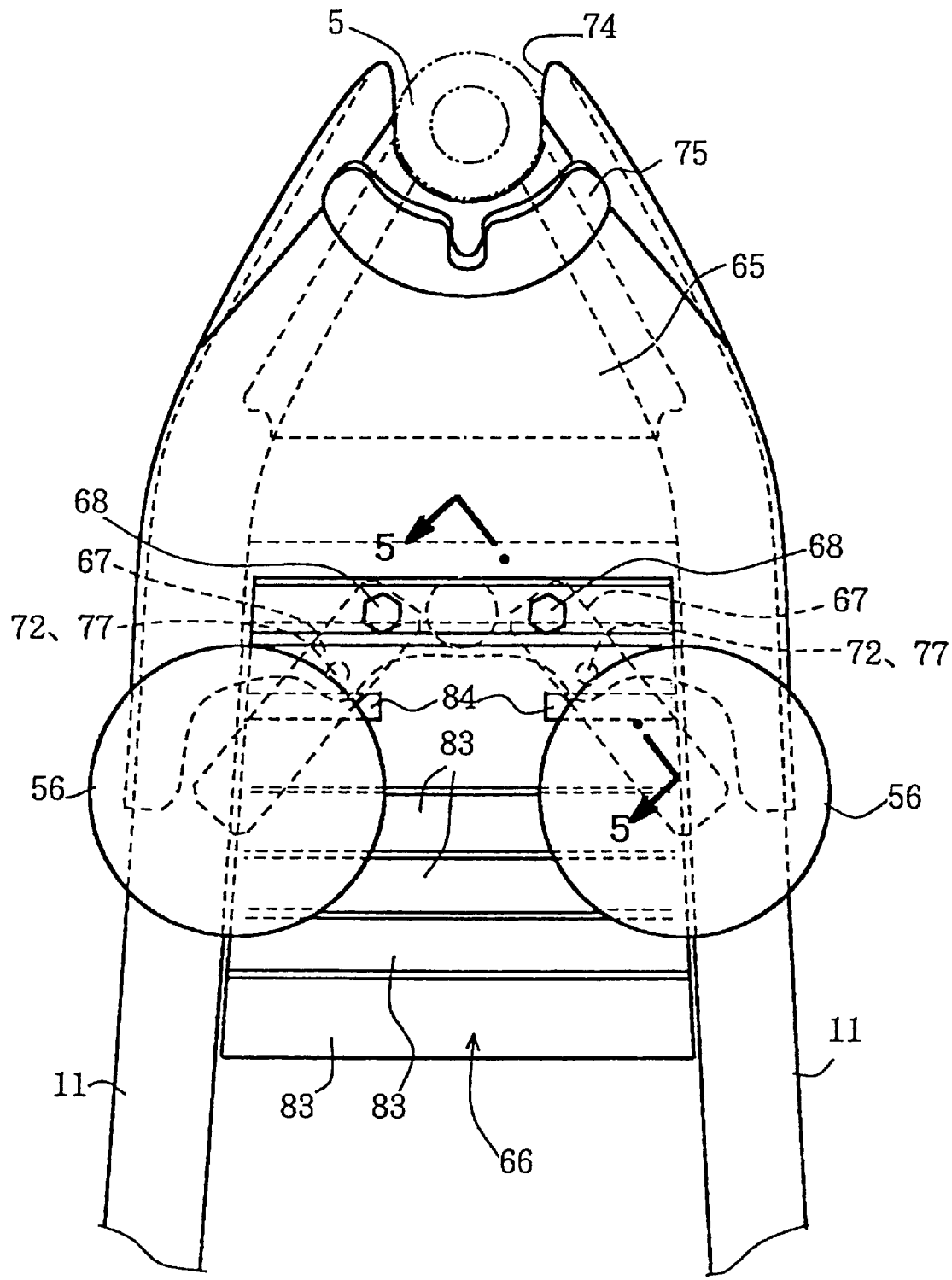
FIG. 4 is a view taken in the direction of an arrow Z shown in FIG. 1.

The horn stays 67 for mounting the horns 56 are strip members formed of metal or resin. As shown in FIG. 4, the pair of horn stays 67 are mounted at their upper end portions in such a manner so as to be arranged in a substantially inverted V-shape. As is apparent from FIG. 5, the upper end portion of each horn stay 67 is formed with a through hole 76 for allowing insertion of the small diameter portion of each shoulder bolt 68, and is further formed with a positioning hole 77 in the vicinity of the through hole 76 for engaging the corresponding positioning projection 72 of the stiffener plate 65.

The operation of this preferred embodiment will now be described. In mounting the wind deflector plate 66 to the vehicle body, the front and rear hooks 87 and 88 formed at the opposite side edges 86 are elastically deformed to be fitted with the down frames 11, thereby temporarily fixing the wind deflector plate 66 to the down frames 11.

Then, the upper portions of the horn stays 67 are inserted through the slits 84 to be located on the rear side of the wind deflector plate 66. In the condition that the through holes 71, 76, and 82 are aligned, the shoulder bolts 68 are inserted through these holes 71, 76, and 82 and tightened with the nuts 69, thereby securing the wind deflector plate 66 and the horn stays 67 together to the stiffener plate 65.

That is, the wind deflector plate 66 and the horns 56 can be mounted together by the common shoulder bolts 68. Accordingly, the mounting structure and operation can be simplified, and the number of parts can be reduced.

Further, since the wind deflector plate 66 is temporarily fixed to the down frames 11, an operator's hand can be removed from the wind deflector plate 66 during the above mounting operation using the shoulder bolts 68. Accordingly, the mounting operation for the horn stays 67 can be performed with both hands of the operator, thereby making the operation easy.

Further, in mounting the horn stays 67, the angle defined between the horn stays 67 is arranged in an inverted V-shape which can be accurately determined by engaging the positioning projections 72 of the stiffener plate 65 into the positioning holes 77 of the horn stays 67. Accordingly, the positioning of the horns 56 can be performed easily and accurately.

During the operation of the motorcycle on which the wind deflector plate 66 is mounted, the air flow W passes over the front fender 53 toward the front side of the engine 20. A part of the air flow W directed to the stiffener plate 65 is blocked by the stiffener plate 65 to be prevented from entering the engine upper space 62 because this space 62 is covered at its upper front portion with the stiffener plate 65. Accordingly, this part of the air flow W is guided obliquely downwardly along the inclined stiffener plate 65.

Further, a part of the air flow W directed to the wind deflector plate 66 located so as to cover a front lower portion of the engine upper space 62 is deflected by the louvers 83 to enter the front side of the engine 20, especially the cylinder 61, thereby cooling the engine 20.

Further, since the right and left sides of the engine upper space 62 are covered with the fuel tank 34, the front side covers 57, and the side gusset plates 58, the air flow W hardly enters the engine upper space 62.

Even if the air flow W enters the engine upper space 62, the air flow W is prevented from reaching a rear portion of the engine upper space 62 because of the partition wall 63 provided in the engine upper space 62. Accordingly, there is almost no possibility that the air flow W may pass over the cylinder 61 and reach the carburetor 21 located behind the cylinder 61.

As a result, icing of the carburetor 21 can be prevented. Simultaneously, operating resistance can be minimized and the engine cooling- efficiency can be improved, because the air flow W is deflected and guided to the engine 20 by the stiffener plate 65 and the wind deflector plate 66.

It should be noted that the present invention is not limited to the above preferred embodiment, but various changes may be made. For example, the stiffener plate 65 is not essential, but the wind deflector plate 66 may be solely used according to the front opening area of the engine upper space 62. Further, the pair of right and left down frames 11 may be replaced by a single down frame provided along the longitudinally extending center line of the vehicle body. In addition, the present invention is applicable not only to the motorcycle, but also to similar vehicles such as a three-wheeled motor vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle having a body frame including two down frame members, an engine supported on the body frame, a fuel tank provided above the engine, and a carburetor provided behind a cylinder of the engine, when viewed from a reference point in front of the vehicle, wherein an engine upper space is defined between the engine and the fuel tank so as to extend from a front portion of the body frame towards the carburetor, the vehicle including a wind deflecting device, comprising:

a wind deflector plate having a louver provided on a front side of the engine upper space for deflecting and guiding an air flow to the front side of the engine; and a stiffener plate mounted on the two down frame members at a position adjacent and above said wind deflector plate, said stiffener plate being a substantially triangular member having a pair of arcuate side portions engaging outer circumferential surfaces of the down frame members, said stiffener plate being designed to deflect the air flow away from the engine upper space, wherein said wind deflector plate and said stiffener plate are essentially coplanar, and said louver is fixed and angled such that the air flow therethrough is directed in a direction angled downwardly.

2. The vehicle according to claim 1, wherein said wind deflector plate is secured to the body frame together with a horn provided in front of the engine.

3. The vehicle according to claim 2, wherein the body frame includes a vertically extending down frame provided before the engine, and the wind deflector plate has means adapted to be temporarily fixed to the down frame.

4. The vehicle according to claim 2, and further comprising positioning means for determining a mounting position of said horn to the body frame.

5. The vehicle according to claim 3, and further comprising positioning means for determining a mounting position of said horn to the body frame.

6. The vehicle according to claim 1, wherein said wind deflector plate is secured to said stiffener plate and said wind deflector plate and said stiffener plate are inclined at a predetermined angle for directing a flow of air to the front side of the engine.

7. The vehicle according to claim 1, wherein said wind deflector plate is formed with at least one boss for enabling attachment of said wind deflector plate to said stiffener plate by a bolt.

8. The vehicle according to claim 1, wherein said wind deflector plate and said stiffener plate are coplanar.

* * * * *